UNITED STATES PATENT OFFICE.

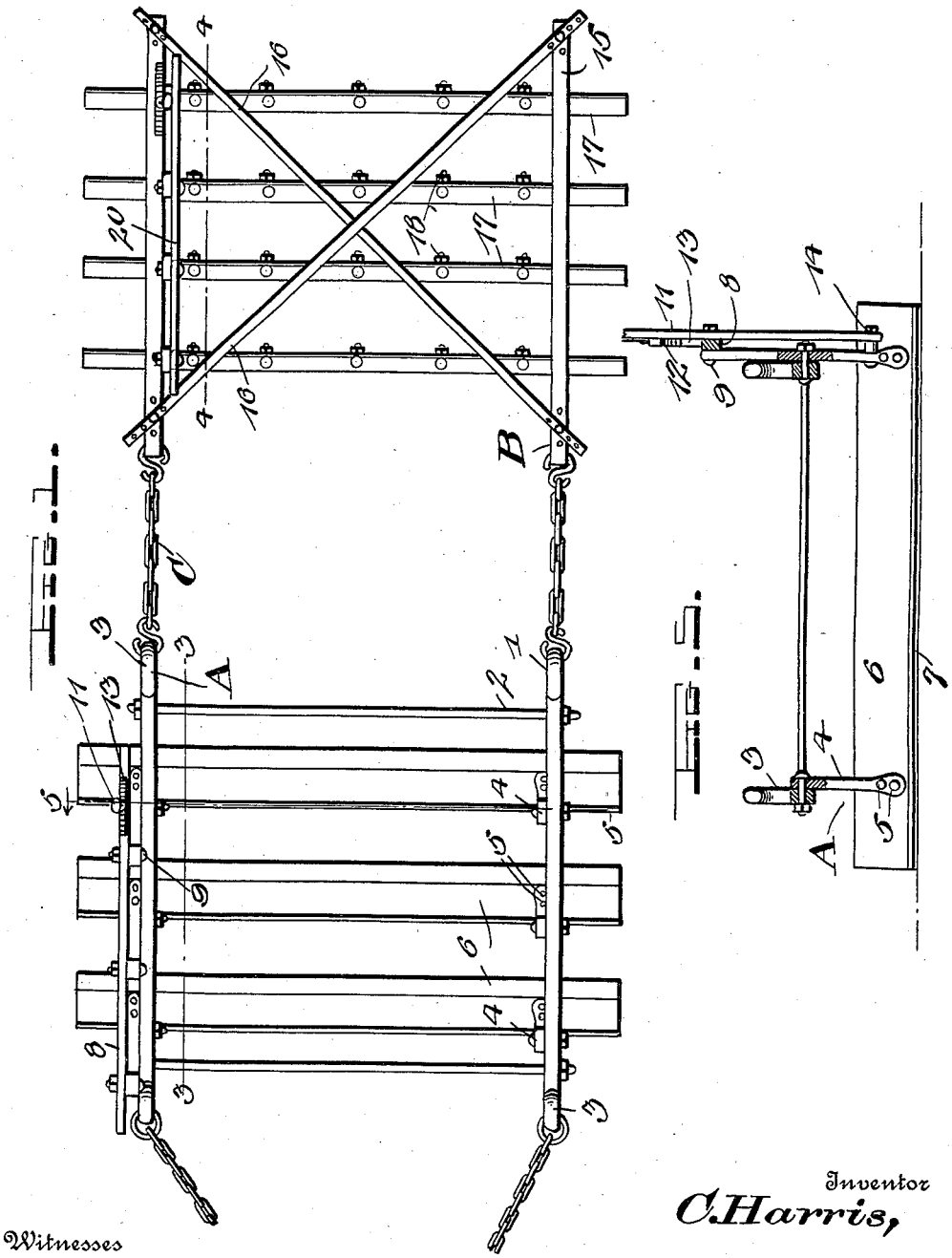

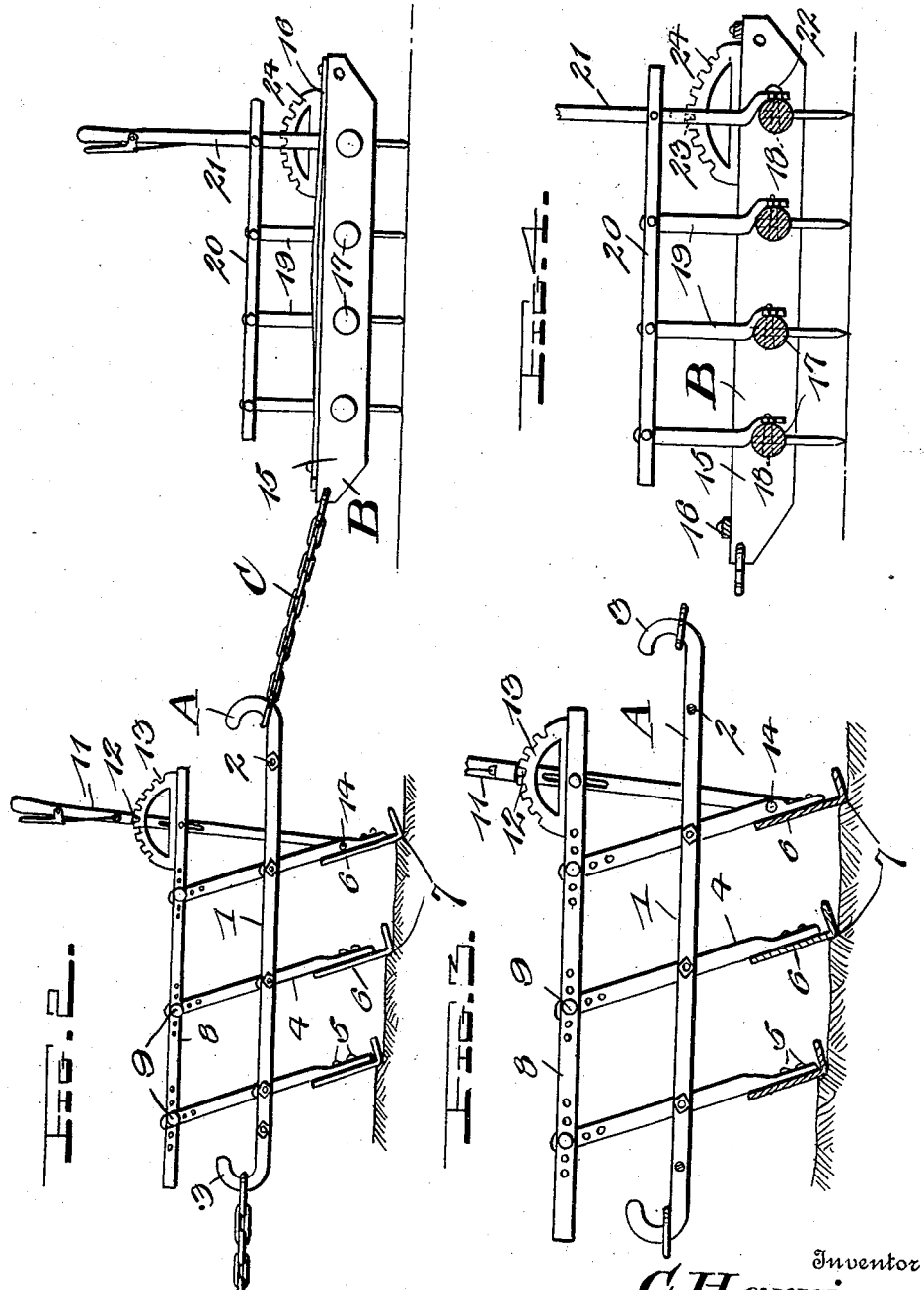

CORNELIUS HARRIS, OF WINCHESTER, INDIANA.

FARMING IMPLEMENT.

1,074,569.  Specification of Letters Patent.  Patented Sept. 30, 1913.

Application filed October 2, 1912. Serial No. 723,612.

*To all whom it may concern:*

Be it known that I, CORNELIUS HARRIS, a citizen of the United States, residing at Winchester, in the county of Randolph and State of Indiana, have invented certain new and useful Improvements in Farming Implements, of which the following is a specification, reference being had to the accompanying drawings.

This invention relates to farming implements and more particularly to drags and harrows.

The principal object of the invention is the provision of a drag including a series of drag bars of various heights whereby various dragging depths may be obtained in the surface of the soil.

Another object of the invention is the provision of a drag comprising a series of drag bars and means for adjusting said bars as a whole.

A further object of the invention is the provision of a drag embodying a series of relatively spaced drag bars and means whereby the relative angle of said bars may be varied.

A still further object of the invention is the provision of a drag embodying a series of spaced drag bars having their lower edges of angular formation so as to provide a durable and efficient edge.

With these and other objects in view as will appear as the description proceeds, the invention comprises the various novel features of construction and arrangement of parts as will be more fully described hereinafter and set forth with particularity in the appended claims.

Referring to the drawings, Figure 1 is a plan view of the drag and harrow; Fig. 2 is a side elevation of the same; Fig. 3 is an enlarged sectional view taken on the line 3—3 of Fig. 1; Fig. 4 is an enlarged section taken on the line 4—4 of Fig. 1; and Fig. 5 is a transverse sectional view taken on the line 5—5 of Fig. 1.

Referring more particularly to the drawing the invention will be seen to consist of a drag A and a harrow B, which latter is connected to the drag in any suitable manner, for instance, by suitable draft chains C. The drag A consists of parallel spaced side bars 1 which are suitably braced by rods 2. The ends of the side bars are provided with means whereby the harrow B may be suitably connected thereto, and in this instance the ends of the bars are shown to be formed to provide a hook 3 whereby the draft chains C are connected thereto.

It is to be understood that if desired the harrow may be used either in the rear of the drag as shown, or may be used in front thereof, it being understood of course that if such latter arrangement is desired the connecting chains C will be removed from the front end of the harrow, connected to the rear end thereof and the remaining end of the said chain will be connected to the hooks 3 on the forward ends of the side bars 1 of the drag A. Pivoted intermediate their ends to the side bars 1 are spaced adjustable supporting arms 4 having secured at their lower ends, by suitable means such as bolts 5, drag bars 6 which have their lower edges bent in angular relation to the bodies of the drag bars. From this it will be seen that each of the drag bars have their lower edges formed so as to provide durable and efficient bearing edges 7. The upper ends of the supporting arms 4 are pivotally connected to a connecting bar through the medium of bolts and nuts 9. The upper end of each bar is provided with a series of holes, the connecting bar 8 being also provided adjacent its connection with the supporting arms 4 with a series of openings, whereby the relative angle between the supporting arms may be varied. By varying the angle of said supporting arms, it will be apparent that any desired depth may be obtained at will.

Connected to the rear end of the connecting bar 8 and pivoted intermediate its ends is a ratchet lever 11 of any well known construction, said ratchet lever embodying a latch 12 adapted to engage the toothed segment 13 suitably secured to the rear end of the connecting bar 8. The lower end of the ratchet lever 11 is pivotally connected to the lower end of the rear supporting arm 4 as shown at 14. By this construction it will be readily apparent that by adjusting the ratchet lever 11 either forward or backward, the relative dragging depths of the various drag bars may be varied at will and should these variations be not sufficient the upper ends of the supporting arms 4 may be adjusted relative to the connecting bar 8 to accomplish the desired result.

The harrow B will be seen to consist of parallel spaced side bars 15, said bars being suitably braced by braces 16. The ends of the braced bars 16 are provided with a series of apertures, as well as the side bars 15, whereby the brace rod 16 may be adjustably secured to said side bars.

Journaled in said side bars are a series of spaced revoluble teeth bars 17. Suitable rake teeth are secured to said bars by means of bolts 18, said bolts being preferably of wedge formation. Adjacent one of the side bars 15 and projecting upwardly from each of the revoluble teeth bars 16, are arms 19, which have their upper ends pivotally secured to a connecting link 20 whereby a like movement may be imparted to all of the teeth bars at the same time. Pivoted intermediate its ends to the connecting link 20 is a ratchet lever 21 having its lower ends suitably connected to the rear tooth bars of the harrow, as shown at 22. A toothed segment 23 is mounted upon a side bar 15 and is adapted to be engaged by the latch 24 of the ratchet lever 21. From this construction it will be apparent that through the medium of the ratchet lever the angle of rake of the harrow teeth may be varied at will.

From the foregoing description, taken in connection with the accompanying drawings, the advantages of construction and arrangement of parts will be readily apparent to those skilled in the art to which the invention relates, and while I have described the principal operation of the device, together with the device which I now consider to be the best embodiment thereof, I desire to have it understood that such changes may be made when desired as are within the scope of the appended claims.

Having thus described the invention, what I claim as new is:

1. A device of the character described comprising spaced side bars, supporting arms pivoted intermediate of their ends to said side bars, drag bars secured to the lower ends of said supporting arms, a connecting bar having adjustable connection with the upper ends of said supporting arms, and means pivotally connected to said connecting bar and to one of said supporting arms, whereby the drag bars may be adjusted simultaneously.

2. A drag comprising spaced side bars, supporting arms pivoted intermediate their ends to said side bars, drag bars secured to the lower ends of said supporting arms, a connecting bar having adjustable connection with the upper ends of said supporting arms, a ratchet lever pivotally arranged upon said connecting bar and having its lower end pivoted to one of the supporting arms whereby the drag bars may be adjusted as a whole.

In testimony whereof I hereunto affix my signature in the presence of two witnesses.

CORNELIUS HARRIS.

Witnesses:
WILLIAM O. HENDRICKSON,
THOMAS W. HUTCHENS.

---

Copies of this patent may be obtained for five cents each, by addressing the "Commissioner of Patents, Washington, D. C."